United States Patent
Kuehl

[15] 3,673,798
[45] July 4, 1972

[54] TURBOCHARGED INTERNAL COMBUSTION ENGINE

[72] Inventor: Paul B. Kuehl, South Bend, Ind.
[73] Assignee: General Motors Corporation, Detroit, Mich.
[22] Filed: Jan. 8, 1971
[21] Appl. No.: 104,866

[52] U.S. Cl. ............................ 60/13, 123/55 VE, 123/119 C
[51] Int. Cl. .................................... F02b 37/04, F02d 39/04
[58] Field of Search .......................... 60/13; 123/55 VE, 119 C

[56] References Cited

UNITED STATES PATENTS

| | | | |
|---|---|---|---|
| 1,403,350 | 1/1922 | Short | 123/55 VE |
| 3,051,147 | 8/1962 | Jackson et al. | 60/13 |
| 2,739,440 | 3/1956 | Seiffert et al. | 123/119 C |
| 2,838,907 | 6/1958 | Cowland | 60/13 |
| 2,777,632 | 1/1957 | Kishline et al. | 60/13 |
| 2,839,038 | 6/1958 | Middlebrooks, Jr. | 123/119 C |
| 3,500,805 | 3/1970 | Reisacher | 60/13 |
| 3,045,419 | 7/1962 | Apple et al. | 60/13 |

FOREIGN PATENTS OR APPLICATIONS

| | | | |
|---|---|---|---|
| 1,043,707 | 12/1954 | Germany | 60/13 |
| 780,621 | 8/1957 | Great Britain | 60/13 |

Primary Examiner—Benjamin W. Wyche
Assistant Examiner—Warren Olsen
Attorney—J. L. Carpenter and Robert J. Outland

[57] ABSTRACT

In preferred form, a V-type internal combustion engine is provided with a combination turbocharger and manifold mounted between the cylinder banks in a compact arrangement. Exhaust manifolds on the outer walls of the cylinder banks interconnect the cylinder exhaust passages with the usual exhaust heat passage extending transversely of the cylinder head through which exhaust gases are delivered to the turbine to the central manifold-turbocharger unit. The combination unit provides water cooling and oil lubrication features in addition to a compact and practical construction.

5 Claims, 4 Drawing Figures

INVENTOR.
Paul B. Kuehl
BY
Robert J. Outland
ATTORNEY

3,673,798

TURBOCHARGED INTERNAL COMBUSTION ENGINE

FIELD OF THE INVENTION

This invention relates to internal combustion engines and, more particularly, to arrangements for turbocharging such engines and to a compact manifold-turbocharger unit for use with such engines.

SUMMARY OF THE INVENTION

The present invention involves the provision of compact arrangements for turbocharging internal combustion engines which may be of conventional construction.

The invention contemplates especially application of a compact manifold-turbocharger unit to V-type engines in combination with outboard exhaust manifolds which recirculate exhaust gases to a transverse passage in the cylinder head or block for delivery of exhaust gases to the central turbine.

Accordingly, it is an object of this invention to provide improved turbocharger arrangements for internal combustion engines.

Another object of the invention is to provide a compact turbocharger arrangement for V-type engines.

Still another object of this invention is to provide compact turbocharger arrangements which are applicable to known non-turbocharged engines of conventional construction.

Yet another object of this invention is to provide a compact manifold-turbocharger arrangement for use with V-type internal combustion engines.

A further object of the invention is to provide a manifold-turbocharger arrangement incorporating means for cooling and lubricating the turbocharger unit utilizing cooling and lubricating fluids received from the engine systems.

These and other objects of the invention may be more fully understood from the following description of a preferred embodiment of the invention, taken together with the accompanying drawings.

BRIEF DESCRIPTION OF THE DRAWINGS

In the drawings:

FIG. 4 is a longitudinal cross-sectional view taken generally in the plane indicated by the Line 4—4 of FIG. 2 and illustrating further details of the manifold-turbocharger unit.

DESCRIPTION OF THE PREFERRED EMBODIMENT

Figure 1:
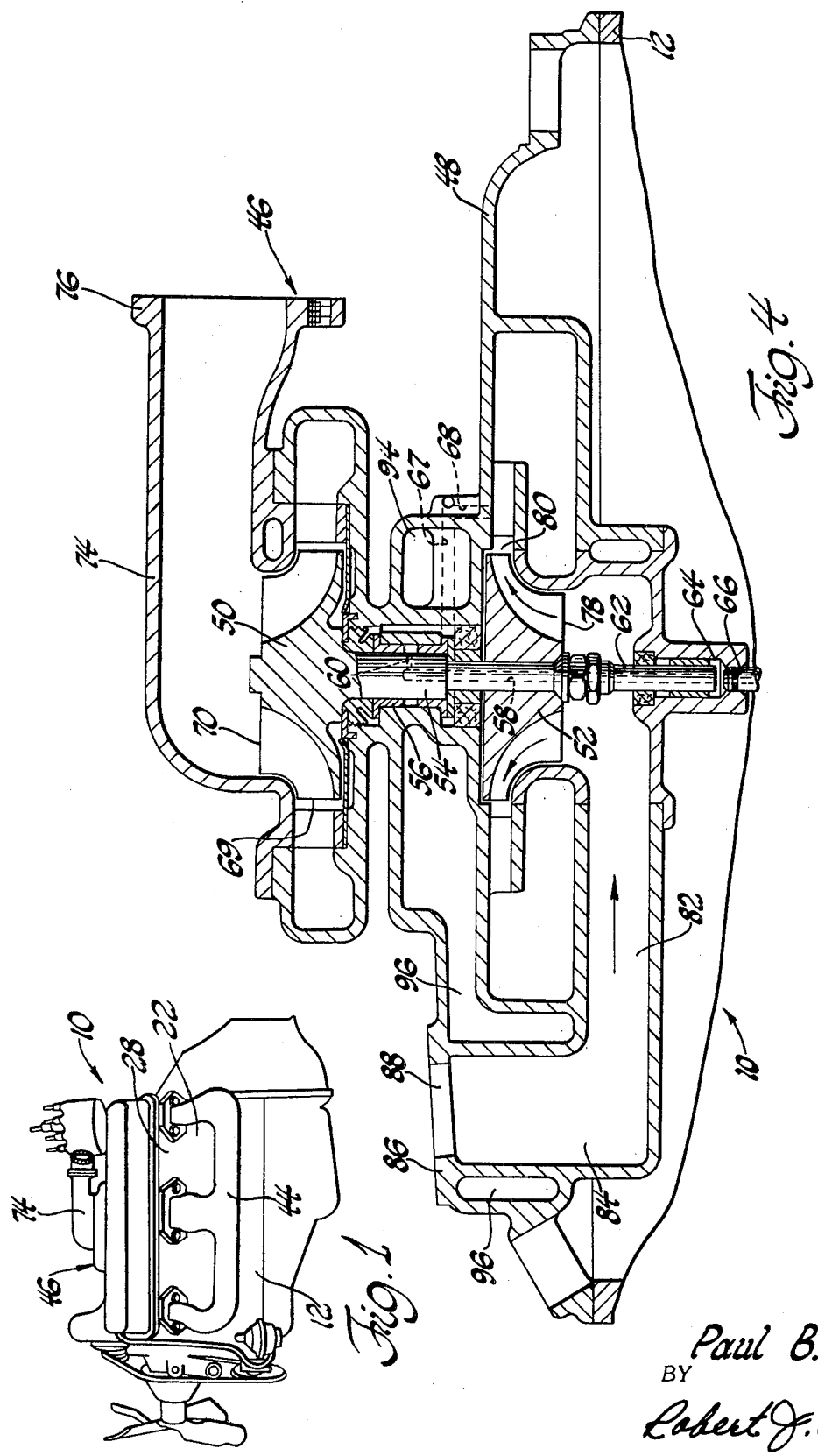
FIG. 1 is a side elevational view of a preferred embodiment of turbocharged internal combustion engine including a manifold-turbocharger unit in accordance with the invention.
Figure 2:
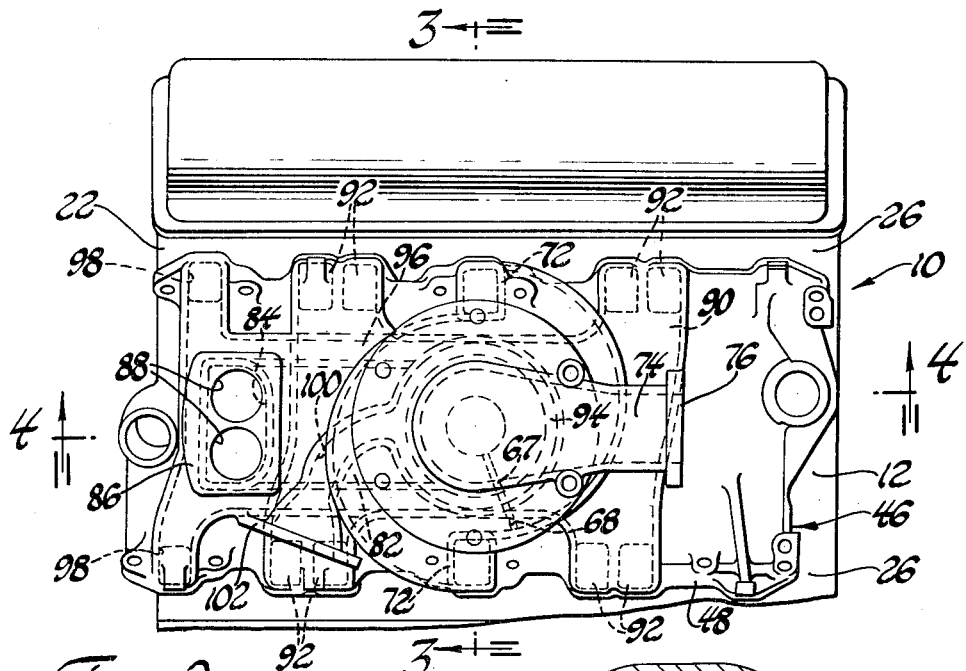
FIG. 2 is a plan view of the engine of FIG. 1 showing the manifold-turbocharger unit in greater detail.
Figure 3:
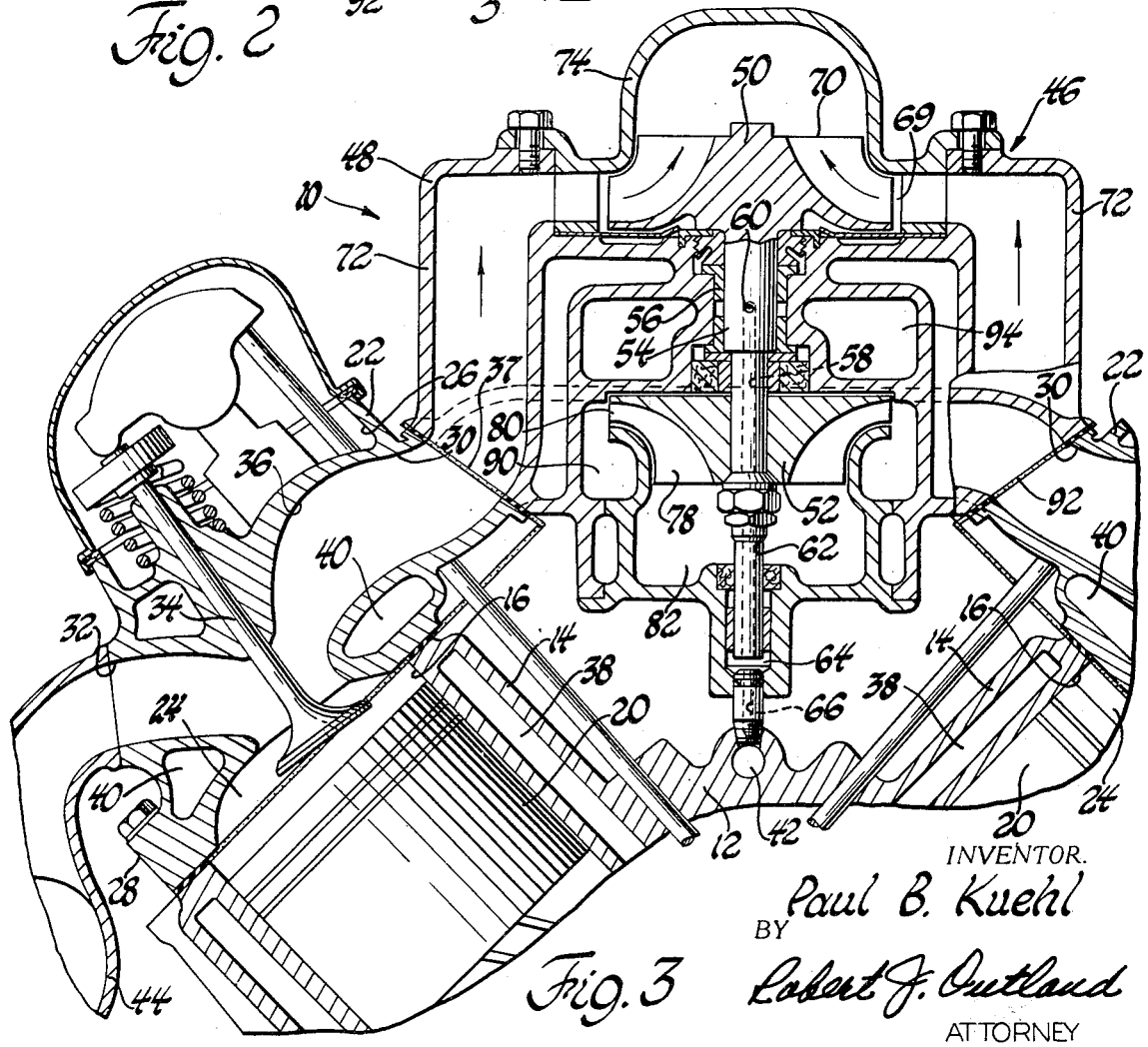
FIG. 3 is a transverse cross-sectional view taken generally in the plane indicated by the Line 3—3 of FIG. 2 and illustrating certain details of the engine and turbocharger arrangement.

In the drawings, numeral 10 generally indicates a V-type internal combustion engine of the type having a cylinder block 12 including a pair of cylinder banks 14 angularly disposed to one another to form a V. Each of the cylinder banks 14 includes a plurality of longitudinally spaced in-line cylinders 16, in each of which is disposed a reciprocable piston 20 connected through conventional means with the usual crankshaft, not shown. The upper ends of cylinders 16 are closed by a pair of cylinder heads 22, forming the outer ends of each of the cylinder banks 14 and acting together with the cylinders and pistons to define a combustion chamber 24 at the upper end of each of the cylinders 16.

Each of the cylinder heads includes inner and outer side walls 26, 28, respectively, with inlet and exhaust passages 30 and 32, respectively, connecting with each combustion chamber and opening respectively through the inner and outer side walls. Suitable valve means 34 are provided to control the communication of each of the inlet and exhaust passages with its respective combustion chamber. An additional transverse exhaust gas passage 36 is also provided in each of the cylinder heads, which communicates with the central pair of exhaust gas passages 32, adjacent their opening into their respective combustion chambers, and extends oppositely therefrom, opening through the inner wall of its respective cylinder head at 37 in approximately the longitudinal center thereof.

Cylinder block 14 also includes coolant passages 38, forming a water jacket around the various cylinders and connecting with various coolant passages 40 in the cylinder head, which terminate in coolant openings, not shown, disposed on the inner sides of the respective cylinder heads, adjacent the front end of the engine. Cylinder block 14 further includes oil distribution means including a longitudinal main oil gallery 42 located between the cylinder banks toward the bottom of the V formed thereby.

On the outer side walls of the two cylinder heads there are mounted exhaust gas manifolds 44 which interconnect the various exhaust passages 32 and direct the exhaust gases emitted from the end passages into the center passages for a purpose to be subsequently described. Exhaust manifolds 44 are conventional except for the elimination of the usual outlet which connects with the engine exhaust system. Accordingly, it is possible to use for the present purpose conventional manifolds with the usual outlet openings blocked. However, there are illustrated in the drawings, special manifolds in which the only openings provided connect with the various exhaust passages extending through the respective cylinder head outside walls.

MANIFOLD-TURBOCHARGER UNIT

Mounted between the engine cylinder banks and secured to the inner side walls of the two cylinder heads is a combination manifold-turbocharger unit formed according to the invention and generally indicated by numeral 46. Unit 46 includes a housing 48 in which is rotatably supported a turbocharger unit including a turbine wheel 50 and a compressor wheel 52, the latter being secured to a generally vertical shaft 54, integrally formed with the compressor wheel 50 so that the turbine and compressor are drivingly connected by the shaft for rotation together.

Shaft 54 is supported by bearing means 56 carried within the housing 48 and lubricated by means of lubricant passages 58, 60, which respectively extend up the center of the shaft 54 and radially out to the surface of the bearing 56. A tubular extension member 62, attached to shaft 54, connects passage 58 with a sealed chamber 64 in a lower portion of the housing 48 and this chamber receives oil from the main oil gallery 42 through a short nipple 66 threadably secured in the engine block 14 and sealingly received within the chamber portion 64 of the housing 48. A pair of connecting drain passages 67, 68 are also provided to connect an oil drain area surrounding bearing 56 with the engine oil sump.

Turbine wheel 50 includes both an inlet 69 and an outlet 70. Inlet 69 is connected with the outlets of the cylinder head transverse gas passages 36 by means of upwardly and inwardly extending exhaust gas passage means 72 which are spaced from the interior portions of the manifold housing 48. Turbine outlet 70 connects with outlet passage means 74 which extends longitudinally rearwardly along the top of the manifold unit to a connection flange 76 provided for connection with a suitable exhaust pipe.

Compressor 52 also includes both an inlet 78 and an outlet 80. The compressor inlet 78 connects through a longitudinally extending passage 82 with a vertically extending passage 84 which in turn connects with a carburetor boss 86 that contains a pair of inlet openings 88 and is adapted to mount a conventional two-barrel carburetor or the like. The compressor outlet 80 opens into a central plenum chamber 90 which in turn feeds a plurality of outlet openings 92 disposed on opposite sides of the manifold unit and connecting with each of the gas inlet passage 30 provided in the cylinder heads 22.

Intermediate the turbine 50 and compressor 52 is an annular coolant chamber surrounding bearing 56 and in heat exchange relation therewith. Chamber 94 receives coolant through a longitudinally extending passage 96 which surrounds the upwardly extending inlet passage 84 and extends in heat exchange relation with the carburetor mounting pad 86 for the purpose of heating the incoming mixture. Passage 96 connects with inlet openings 98, disposed on either side of the manifold unit, which connect with the cylinder head coolant openings for the purpose of transmitting coolant from the engine block and cylinder heads into the manifold unit. The outflow of coolant from chamber 94 is provided for by a curved outlet passage 100, along the top of housing 48, that terminates in an outlet flange 102, to which a coolant return fitting for connection with the radiator of an associated vehicle is adapted to be secured.

OPERATION

In operation, fuel burned in the combustion chambers of the end cylinders of the engine is exhausted through the respective exhaust ports 32 and is directed by the exhaust manifolds 44 into the exhaust ports 32 of the central cylinders, where it joins with exhaust gases expelled from the center cylinders and is passed through the cylinder head transverse passages 36 and passages 72 of the manifold unit to the turbine wheel 50, causing rotation of the turbocharger assembly. The spent exhaust gases then pass out through the exhaust passage 74 to the exhaust system. At the same time combustible fuel mixture is delivered by the carburetor, not shown, through openings 88 and through passages 84 and 82 to the compressor wheel, which increases the pressure of the mixture. The pressurized mixture is then delivered through the plenum 90 and the various openings 92 to the inlet passages 30 of the various cylinder heads, from which it is in turn delivered to the various engine combustion chambers to be burned.

The proper vaporization of the fuel in the fuel mixture is maintained by heat supplied to the carburetor and passage 84 by coolant delivered from the engine coolant jacket to the manifold unit through openings 98. The coolant then moves through passage 96 to chamber 94, where it is utilized to cool the turbocharger bearing and is returned to the associated vehicle radiator through the outlet passage 100. The spacing of the exhaust gas passage means 72 from the inner body of the manifold containing coolant passages 94 and plenum 90 prevents the unnecessary loss of heat from the exhaust passages, as well as the undesired addition of heat to the coolant and fuel mixture in the chamber 94 and plenum 90, respectively.

Lubrication of the turbocharger bearing 56 is provided from the main engine oil gallery 42 through nipple 66 and chamber 64 which, in turn, feeds extension member 62 and passages 58 and 60 of shaft 54 so as to direct oil onto the surface of bearing 56. Oil leaking from around bearing 56 is returned to the engine oil sump through drain passages 67 and 68 provided in the housing 48.

While the invention has been described by reference to a specific embodiment chosen for purposes of illustration, it should be apparent that numerous changes could be made within the spirit and scope of the inventive concepts disclosed and, accordingly, it is intended that the invention be limited only by the language of the following claims.

I claim:

1. In combination with an internal combustion engine having a bank of cylinders, each cylinder carrying a reciprocable piston, and a cylinder head mounted on said cylinder bank and closing the ends of said cylinders to define combustion chambers with said cylinders and their respective pistons, said cylinder head having generally oppositely disposed first and second side walls, a plurality of valve controlled exhaust passages in said cylinder head, each of said exhaust passages connecting with one of said combustion chambers and opening through said first cylinder head side wall, an exhaust manifold interconnecting said exhaust passages and mounted along said cylinder head first side wall, a plurality of valve controlled inlet passages in said cylinder head, each of said inlet passages connecting with one of said combustion chambers and opening through said second cylinder head side wall, an inlet manifold mounted along said cylinder head second side wall and having passage means communicating with each of said cylinder head inlet passages, a turbocharger carried by said inlet manifold and including a compressor having an outlet connected to said inlet manifold passage means, said turbocharger also including a turbine, drivingly connected with said compressor and having an inlet, said cylinder head having a transverse passage opening through said second cylinder head side wall and connecting with said exhaust manifold and means connecting said cylinder head transverse passage with said turbocharger turbine inlet.

2. In combination with an internal combustion engine having a cylinder block including a pair of cylinder banks arranged in a V, a plurality of closed end cylinders in each of said banks, said cylinders carrying reciprocable pistons and defining combustion chambers therewith, said cylinder banks each having generally oppositely disposed inner and outer side walls, a plurality of valve controlled exhaust passages opening through the outer wall of each of said cylinder banks and each connecting with one of said combustion chambers, exhaust manifolds mounted on the outer walls of each of said banks and interconnecting the exhaust passages thereof, a plurality of valve controlled inlet passages opening through the inner side wall of each of said cylinder banks and each connecting with one of said combustion chambers, an inlet manifold mounted between said cylinder banks and having passage means communicating with each of said inlet passages, a turbocharger carried by said inlet manifold and including a compressor having an outlet connected to said inlet manifold passage means and a turbine drivingly connected with said compressor and having an inlet, said cylinder banks each having a transverse passage opening through its respective inner side wall and connecting with one of the exhaust passages of the respective cylinder bank and therethrough with the respective exhaust manifold and means connecting said transverse passages with said turbocharger turbine inlet.

3. In combination with an internal combustion engine, a cylinder block including a pair of cylinder banks arranged in a V, a plurality of closed end cylinders in each of said banks, said cylinders carrying reciprocable pistons and defining combustion chambers therewith, said cylinder banks each having an inner side wall, a plurality of valve controlled inlet passages opening through the inner side wall of each of said cylinder banks, each inlet passage connecting with one of said combustion chambers, an exhaust passage in each of said cylinder banks and opening through its respective inner side wall, said exhaust passages each being interconnected with the various combustion chambers of its respective cylinder bank, a combination turbocharger-manifold unit mounted between said cylinder banks on the respective inner side walls thereof, said combination unit including a turbine having an inlet and drivingly connected by a shaft with a compressor having an outlet, exhaust passage means communicating said turbine inlet with said cylinder head exhaust passages and inlet passage means communicating said compressor outlet with each of said cylinder head inlet passages, said cylinder block having an oil distribution gallery extending longitudinally thereof intermediate said cylinder banks, bearing means in said turbocharger-manifold unit and surrounding said shaft for rotationally supporting said turbine and compressor, said shaft including oil passage means extending from one end thereof to the inner surface of said bearing means, and oil distribution means communicating said shaft end with said cylinder block oil gallery for supplying oil to said bearing means.

4. In combination with an internal combustion engine, a cylinder block including a pair of cylinder banks arranged in a V, a plurality of closed end cylinders in each of said banks, said cylinders carrying reciprocable pistons and defining combustion chambers therewith, said cylinder banks each having an inner side wall, a plurality of valve controlled inlet passages opening through the inner side wall of each of said cylinder banks, each inlet passage connecting with one of said combustion chambers, an exhaust passage in each of said cylinder banks and opening through its respective inner side wall, said exhaust passages each being interconnected with the various combustion chambers of its respective cylinder bank, a combination turbocharger-manifold unit mounted between said cylinder banks on the respective inner side walls thereof, said combination unit including a turbine having an inlet and drivingly connected by a shaft with a compressor having an outlet, exhaust passage means communicating said turbine inlet with said cylinder head exhaust passages and inlet passage means communicating said compressor outlet with each of said cylinder head inlet passages, said cylinder block having an oil distribution gallery extending longitudinally thereof intermediate said cylinder banks, bearing means in said turbocharger-manifold unit and surrounding said shaft for rotationally supporting said turbine and compressor, said shaft including oil passage means extending from one end thereof to the inner surface of said bearing means, oil distribution means communicating said shaft end with said cylinder block oil gallery for supplying oil to said bearing means, said cylinder block including a coolant jacket for cooling said cylinders and connecting passages, said coolant jacket having an outlet opening through the inner walls of each of said cylinder banks, and said turbocharger-manifold unit further including coolant passages surrounding said turbocharger bearing means for controlling the temperature thereof, coolant inlet means connecting said coolant passages with said cylinder block coolant jacket at said inner wall outlet openings and coolant outlet means adapted to provide for the removal of coolant from said coolant passages.

5. A combination turbocharger-manifold unit for use in conjunction with an internal combustion engine, said unit comprising a housing carrying bearing means, a turbine and a compressor spacedly connected by a vertically extending shaft and carried for rotation in said bearing means, said turbine and said compressor each including an inlet and an outlet, a carburetor mounting boss adjacent one end of said housing, inlet passage means extending downwardly from said carburetor mounting boss and longitudinally of said housing to said compressor inlet, a plenum chamber surrounding said compressor outlet and connecting with a plurality of spaced outlet openings extending in separate planes along opposite sides of said housing, a pair of exhaust passage defining means having openings intermediate said plenum openings and in the planes thereof, said exhaust passage means extending upwardly alongside and in spaced relation with said inlet passages and being directed inwardly to the inlet of said turbine, outlet passage means connecting the outlet of said turbine with an exhaust flange connection, and coolant passage means surrounding said bearing means and extending longitudinally of said housing on either side of said inlet passage means below said carburetor mounting boss, said coolant passage means terminating on either side of said carburetor mounting boss in opening means disposed in the planes of said plenum openings and outlet passage means connecting with said coolant passage means and terminating in a connector boss.

* * * * *